US008723645B2

(12) United States Patent
Ayyagari et al.

(10) Patent No.: US 8,723,645 B2
(45) Date of Patent: May 13, 2014

(54) DATA SYNCHRONIZATION AND INTEGRITY FOR INTERMITTENTLY CONNECTED SENSORS

(75) Inventors: Arun Ayyagari, Seattle, WA (US); Kevin Y. Ung, Bellevue, WA (US); Marc R. Matsen, Seattle, WA (US); Karl L. Johnson, Seattle, WA (US); David B. Blackwell, Seattle, WA (US); William P. Coop, Kent, WA (US)

(73) Assignee: The Boeing Company, Chicago, IL (US)

( * ) Notice: Subject to any disclaimer, the term of this patent is extended or adjusted under 35 U.S.C. 154(b) by 1740 days.

(21) Appl. No.: 11/755,373

(22) Filed: May 30, 2007

(65) Prior Publication Data

US 2007/0290803 A1    Dec. 20, 2007

Related U.S. Application Data

(60) Provisional application No. 60/804,325, filed on Jun. 9, 2006.

(51) Int. Cl.
*H04Q 5/22*    (2006.01)

(52) U.S. Cl.
USPC ..................... 340/10.1; 340/13.26

(58) Field of Classification Search
USPC .............. 340/10.1, 10.2, 10.3, 539.1, 572.1
See application file for complete search history.

(56) References Cited

U.S. PATENT DOCUMENTS

| | | | | |
|---|---|---|---|---|
| 6,664,897 | B2 * | 12/2003 | Pape et al. | 340/573.3 |
| 6,816,762 | B2 * | 11/2004 | Hensey et al. | 701/32.6 |
| 7,040,532 | B1 * | 5/2006 | Taylor et al. | 235/375 |
| 7,183,924 | B1 * | 2/2007 | Ku | 340/572.1 |
| 7,204,409 | B2 * | 4/2007 | Kumar et al. | 235/375 |
| 7,327,218 | B2 * | 2/2008 | Hohberger et al. | 340/10.1 |
| 7,378,966 | B2 * | 5/2008 | Agarwal et al. | 340/572.1 |
| 7,443,282 | B2 * | 10/2008 | Tu et al. | 340/10.1 |
| 7,518,511 | B1 * | 4/2009 | Panja et al. | 340/572.1 |
| 7,548,802 | B2 * | 6/2009 | Avery et al. | 701/29.3 |
| 7,554,441 | B2 * | 6/2009 | Viegers et al. | 340/539.22 |
| 7,589,616 | B2 * | 9/2009 | Klatsmanyi et al. | 340/10.1 |
| 7,742,862 | B2 * | 6/2010 | Anderson et al. | 701/50 |
| 7,756,621 | B2 * | 7/2010 | Pillar et al. | 701/41 |
| 7,868,738 | B2 * | 1/2011 | Dasgupta et al. | 340/10.32 |
| 7,904,569 | B1 * | 3/2011 | Gelvin et al. | 709/229 |

(Continued)

FOREIGN PATENT DOCUMENTS

| | | |
|---|---|---|
| JP | 2005-339238 | 12/2005 |
| JP | 2005 339238 | 12/2005 |

(Continued)

OTHER PUBLICATIONS

International Search Report, corresponding to International Patent Application No. PCT/US2007/013332, dated Jun. 20, 2008.

(Continued)

*Primary Examiner* — Jennifer Mehmood
*Assistant Examiner* — Rufus Point
(74) *Attorney, Agent, or Firm* — Charles L. Moore; Moore & Van Allen PLLC (57) ABSTRACT

A system for data synchronization of intermittently connected sensors may include an RFID system and an information management system. The system may also include an application to insure integrity of data retrieved or posted between the RFID system and the information management system.

30 Claims, 6 Drawing Sheets

(56) References Cited

U.S. PATENT DOCUMENTS

| | | | |
|---|---|---|---|
| 2002/0158765 A1* | 10/2002 | Pape et al. | 340/573.3 |
| 2004/0128162 A1* | 7/2004 | Schlotterbeck et al. | 705/2 |
| 2004/0176667 A1* | 9/2004 | Mihai et al. | 600/300 |
| 2004/0193641 A1* | 9/2004 | Lin | 707/104.1 |
| 2005/0125414 A1* | 6/2005 | Navas et al. | 707/10 |
| 2005/0246337 A1* | 11/2005 | Forman et al. | 707/9 |
| 2006/0031293 A1 | 2/2006 | Thommes et al. | |
| 2006/0253894 A1* | 11/2006 | Bookman et al. | 726/2 |
| 2007/0024463 A1* | 2/2007 | Hall et al. | 340/825.69 |
| 2007/0035396 A1* | 2/2007 | Chand et al. | 340/572.1 |
| 2007/0046467 A1* | 3/2007 | Chakraborty et al. | 340/572.1 |
| 2007/0100858 A1* | 5/2007 | Milstead et al. | 707/101 |
| 2007/0288520 A1* | 12/2007 | Hatanaka et al. | 707/104.1 |
| 2007/0290803 A1* | 12/2007 | Ayyagari et al. | 340/10.1 |

FOREIGN PATENT DOCUMENTS

| | | |
|---|---|---|
| WO | 2006035430 | 4/2006 |
| WO | 2006036978 | 4/2006 |
| WO | WO2006/035430 A | 4/2006 |
| WO | WO2006/036978 A | 4/2006 |

OTHER PUBLICATIONS

Written Opinion, corresponding to International Patent Application No. PCT/US2007/013332, dated Jun. 20, 2008.

European Patent Office, European Application No. 07815062.0 Office Action dated Jul. 24, 2013, pp. 1-4.

\* cited by examiner

DATA SYNCHRONIZATION AND INTEGRITY FOR INTERMITTENTLY CONNECTED SENSORS

CROSS REFERENCE TO RELATED APPLICATIONS

This application claims benefit of priority under 35 U.S.C. §119(e) to the filing date of U.S. Provisional Application No. 60/804,325, as filed on Jun. 9, 2006, which is incorporated herein by reference in its entirety.

BACKGROUND OF THE INVENTION

The present invention relates to data synchronization and integrity and more particularly to a system and method for data synchronization and integrity for intermittently connected sensors.

Radio Frequency Identification (RFID) is being implemented in various new applications. One proposed application is deployment on-board aircraft and within product supply chains including manufacturing. Such deployment will require the integration of critical business processes such as industrial tracking and inventory/asset management. This evinces the need for security and access control applications when using RFID based sensor networks to ensure that the deployed systems adequately protect competition sensitive infrastructure and information associated with the critical business processes. Securing RFID tag data is essential to thwart the entry of counterfeit parts into the supply chain of the original equipment manufacturers (OEM) via early detection. While this is important to industry at large, it is crucial to aerospace, pharmaceutical, and automotive industries. Securing end-to-end data flow to ensure that critical information cannot be queried nor viewed by unauthorized entities is important and requires access control.

BRIEF SUMMARY OF THE INVENTION

In accordance with an embodiment of the present invention, a system for data synchronization of intermittently connected sensors may include an application to ensure the integrity of the data retrieved or posted between a front-end RFID system and a backend information system. The system may also include a data schema for user data on an RFID tag that minimizes an amount of data that may need to be read from the tag. The system may also include a context and event manager functionality being maintained on an RFID reader to ensure more effective contextual RFID tag read/write operation. A data store-forward capability may be provided within the RFID reader and an event manager to ensure continued operation when disconnected from the backend information management system and to also ensure that there is no overall loss of data during the disconnection. A data locking mechanism and synchronization mechanism may be provided between the front-end application and the backend IM system to ensure proper operation of backend applications and decision support systems. The system may further include a cryptographic hash associated with each RFID tag for write operations to ensure effective data validation for data read from the tag and that may be stored on the secure backend information management system.

In accordance with another embodiment of the present invention, a system for data synchronization of intermittently connected sensors may include an RFID system and an information management system. The system may also include an application to insure integrity of data retrieved or posted between the RFID system and the information management system.

In accordance with another embodiment of the present invention, a method for data synchronization of intermittently connected sensors may include providing a data schema to minimize an amount of data to be read from an RFID tag. The method may also include maintaining context and event manager functionality on an RFID reader to facilitate contextual RFID tag read/write operation.

In accordance with another embodiment of the present invention, a system for maintaining an aircraft may include an RFID system for reading and writing information on an RFID tag associated with a component of the aircraft. The system may also include an information management system and an application to insure integrity of data retrieved or posted between the RFID system and the information management system.

In accordance with another embodiment of the present invention, a method for maintaining an aircraft may include associating an RFID tag with an aircraft component. The method may also include providing security for data on the RFID tag.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium, such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
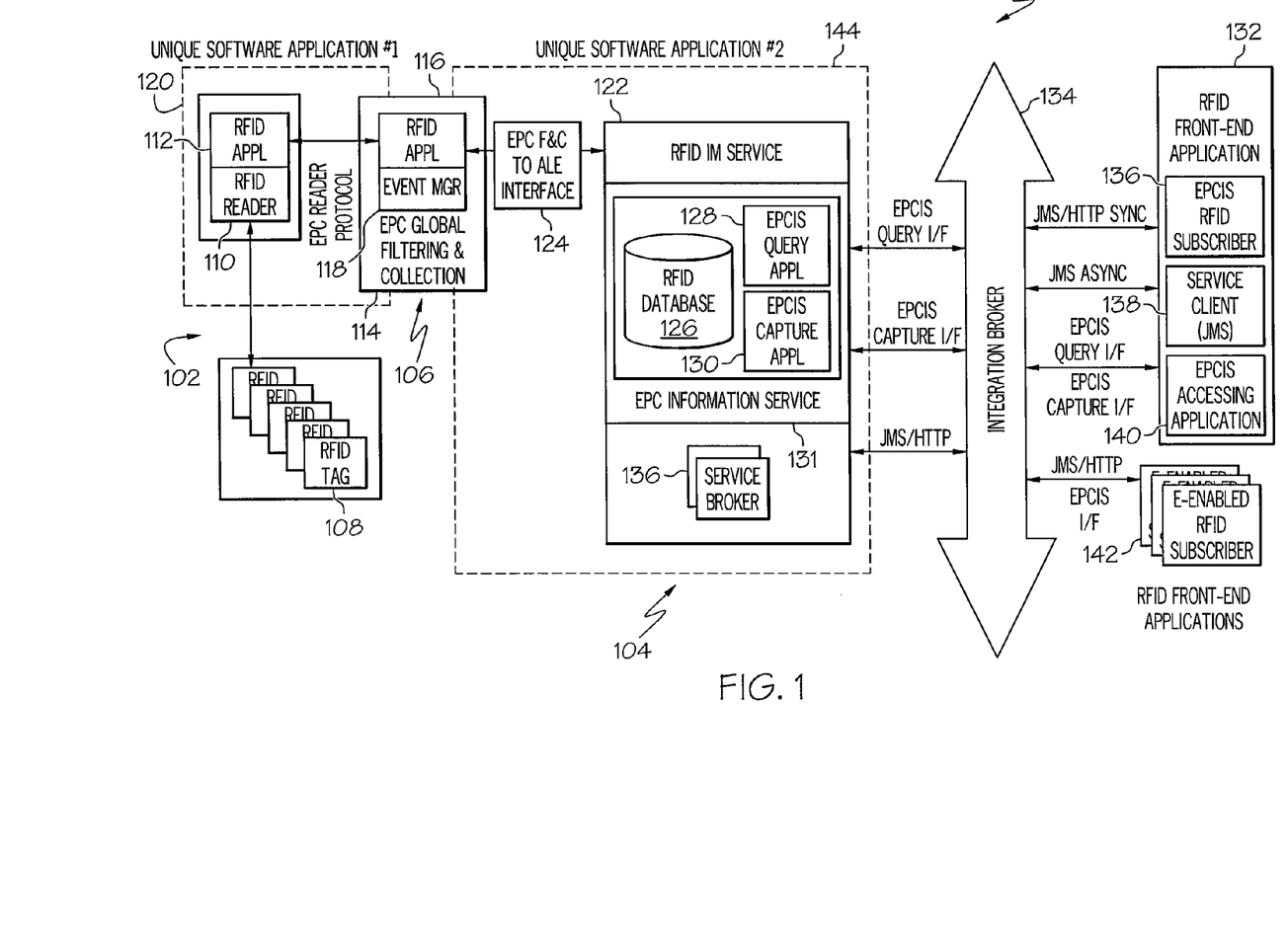
FIG. 1 is a block diagram of an example of a system for data synchronization and integrity in accordance with an embodiment of the present invention.

FIG. 1 is a block diagram of an example of a system 100 for data synchronization and integrity in accordance with an embodiment of the present invention. The system 100 may include an RFID system 102 and an information management (IM) system 104. The system 100 may also include an application 106, module or component to insure integrity of data retrieved or posted between the RFID system 102 and the IM system 104.

The RFID system 102 may include a plurality of RFID tags 108. Each RFID tag 108 may be either a passive or active RFID tag. Both passive and active RFID tags may be combined with other sensors within the same device. Active RFID tags have their own power supply for generating and transmitting a response when interrogated or read.

Each RFID tag 108 may be associated with a part or component of another system, device or equipment, such as a part or component of an aircraft or other vehicle. The RFID tag 108 may be associated with the part or component during a manufacturing process to track or monitor the component during the manufacturing process and/or when the system, device or equipment is in service.

The RFID system 102 may also include a RFID reader 110. The RFID reader may be used to read and write to the RFID tags 108. The RFID tags 108 and reader 110 operate in accordance with an RFID air interface protocol for exchange of data between them.

The RFID system 102 may also include an RFID application 112 associated with the RFID reader 110. The RFID application 112 may provide high level wrapper functions that perform a specific task by invoking one or more RFID tag read/write calls as specified by the RFID air interface protocols. In addition the wrapper functions may determine the specific RFID tag read/write parameters based on the context and per the user data format specifications, such as Air Transportation Association (ATA) Spec. 2000 or other specifications. The context may include an identification of the system, device, equipment or the like, such as an aircraft identification or tail number, or the context may involve a job type or other indication of what the data on the RFID tag may be for or related to.

A filtering and collection module 114 may be provided to interface between the RFID system 102 and the IM system 104. The filtering and collection module 114 may be an Electronic Product Code global (EPCglobal) filtering and collection (EPC F&C) module or unit 114. Another RFID application 116 may be associated with the filtering and collection module 114. The RFID application 116 associated with the EPCglobal filtering and collection 114 may establish the context and forward the appropriate commands to the peer RFID application 112 associated with the RFID reader 110. The RFID application 116 and peer RFID application 112 associated with the RFID reader 110 may interface with one another using an EPC reader protocol. Additionally, the RFID application 116 associated with the EPCglobal filtering and collection 114 may enable asynchronous operation when disconnected from the backend RFID IM system 104 by providing local store capabilities. The RFID application 116 may also coordinate and synchronize data between RFID tags 108 and the backend RFID IM system 104. This operation also includes the validation of data to and from RFID tags 108 to ensure information integrity using keyed cryptographic hash or other data security techniques.

The system 100 may also include an event manager 118. The event manager 118 may be associated with the filtering and collection module 114. The event manager 118 may enable filtering and eventing based on information retrieved from the RFID tags 108 and backend IM system 104 per the context.

The RFID application 112 and RFID reader 110 and at least portions of the functionality of the RFID application 116 and event manager 118 associated with the EPCglobal filtering and collection 114 may be embodied in a first software application or module 120 illustrated in FIG. 1 by the by the dash line and labeled "Unique Software Application #1" which may be operable on or embodied in a processor or similar device. An example of the different functions or operations that may be performed by the first software application or module 120 will be described in more detail with reference to FIG. 4.

The IM system 104 may include an RFID IM service module 122. The RFID IM service module 122 may interface with the RFID application 116 via an EPC F&C to ALE (Application Level Events) interface 124. A RFID database 126 may be associated with the RFID IM service module 122. The RFID database 126 may be the backend data repository for the RFID tag data associated with each airplane or other equipment or system.

The RFID IM service module 122 may also include an Electronic Product Code Information Service (EPCIS) query application 128 and EPCIS capture application 130. The RFID database 126, EPCIS query application 128 and EPCIS capture application 130 may define or may be included in an EPC information service module 131. The EPCIS query application 128 may enable applications to query RFID IM service module 122 for data associated with a particular airplane or other equipment and to query the RFID tags 108 following the EPCIS protocols. On receiving a query, requested data may be retrieved from the RFID database 126 by the EPCIS capture application 130 and forwarded to a particular application 132 or requesting application via an Integration Broker 134 based on Service Oriented Architecture (SOA). A service broker 136 may be provided to enable access controlled applications to access RFID part information in asynchronous or synchronous means from the RFID database 126.

As previously discussed, RFID front-end applications 132 or the like may access the IM system 104 via the integration broker 134. The front-end applications 132 may interface with the integration broker 134 using Java Message System/HyperText Transfer Protocol OMS/HTTP) or the like for synchronous access and JMS or similar technology for asynchronous access. The front-end applications 132 may be operable on a processor or other computing device.

Examples of front-end applications 132 may include EPCIS RFID subscribers 137, a service client 138, an EPCIS accessing application 140 or similar applications. Other non EPCIS RFID subscribers, such as e-enabled RFID subscribers 142 may also access the IM system 104 via the integration broker 134 using JMS/HTTP and an EPCIS interface.

The RFID IM service module 122 and associated components may embody or include a second software application or module 144 illustrated by the dashed box and label "Unique Software Application #2" in FIG. 1 which may be operable on or embodied in a processor or similar device. The processor may be same or a different processor from the processor on which application 120 is operable. Examples of the functions and operations that may be performed by the second software application or module 144 will be described in more detail with reference to FIG. 5.

Figure 2:
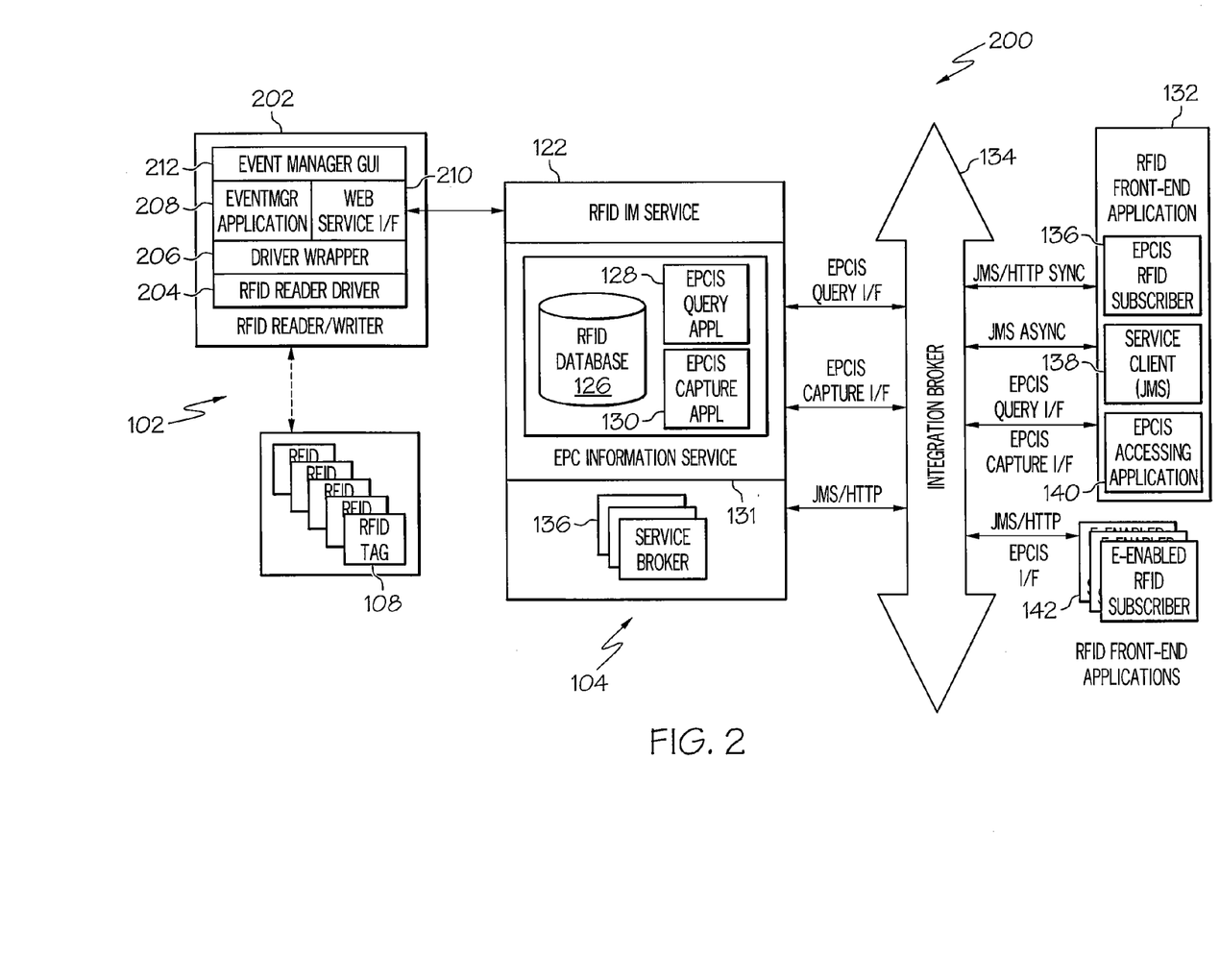
FIG. 2 is a block diagram of an example of another system for data synchronization and integrity in accordance with another embodiment of the present invention.

FIG. 2 is a block diagram of an example of another system 200 for data synchronization and integrity in accordance with another embodiment of the present invention. The system 200 is similar to system 100 of FIG. 1 and similar elements or components have the same reference numerals. The system 200 includes an architecture wherein the event manager and RFID reader are co-located or combined in a module or integrated device that may be referred to as an RFID reader/writer 202. The RFID reader/writer 202 may include an RFID reader driver 204. The RFID reader driver 204 may implement specific RFID tag read/write commands in compliance with RFID air interface protocols.

The RFID reader/writer 202 may also include a driver wrapper 206. The driver wrapper 206 may provide high level wrapper functions that perform a specific task by invoking one or more RFID tag read/write calls as specified by the RFID air interface protocols. In addition the wrapper functions may determine the specific RFID tag read/write parameters based on the context and per the user data format specifications such as ATA Spec. 2000 or the like.

The RFID reader/writer 202 may also include an event manager (EventMgr) application 208, a web service interface (I/F) 210 and an event manager graphical user interface (GUI) 212. The event manager application 208 is the core engine that interacts with the driver wrapper 206 for RFID tag read/write functions. The event manager GUI 212 may display information and retrieve user inputs. The web service interface 210 may interact with the backend RFID IM system 104. The web service interface 210 may enable web services based data exchange between RFID Reader/Writer 202 and RFID IM service module 122.

All data flow within the RFID reader/writer 202 pass through the event manager application 208. For example, data from the driver wrapper 206 intended to be displayed to the user would first be directed to the event manager application 208 which will appropriately process the information and then forward it to the event manager GUI 212. The core engine or event manager application 208 establishes the context and forwards appropriate commands to the peer sub-components such as driver wrapper 206, event manager GUI 212, and web service interface 210. In addition, the event manager application 208 enables asynchronous operation when disconnected from the backend RFID IM system 104 by providing local store capabilities. The event manager application 208 or core engine also coordinates and synchronizes data between RFID tags 108 and the backend RFID IM system 104. This operation also includes the validation of data to and from the RFID tags 108 to ensure information integrity using keyed cryptographic hash or similar data security techniques. The event manager application 208 or core engine may also enable filtering and eventing based on information retrieved from the RFID tags 108 and the backend IM system 104 per the context.

Figure 3:
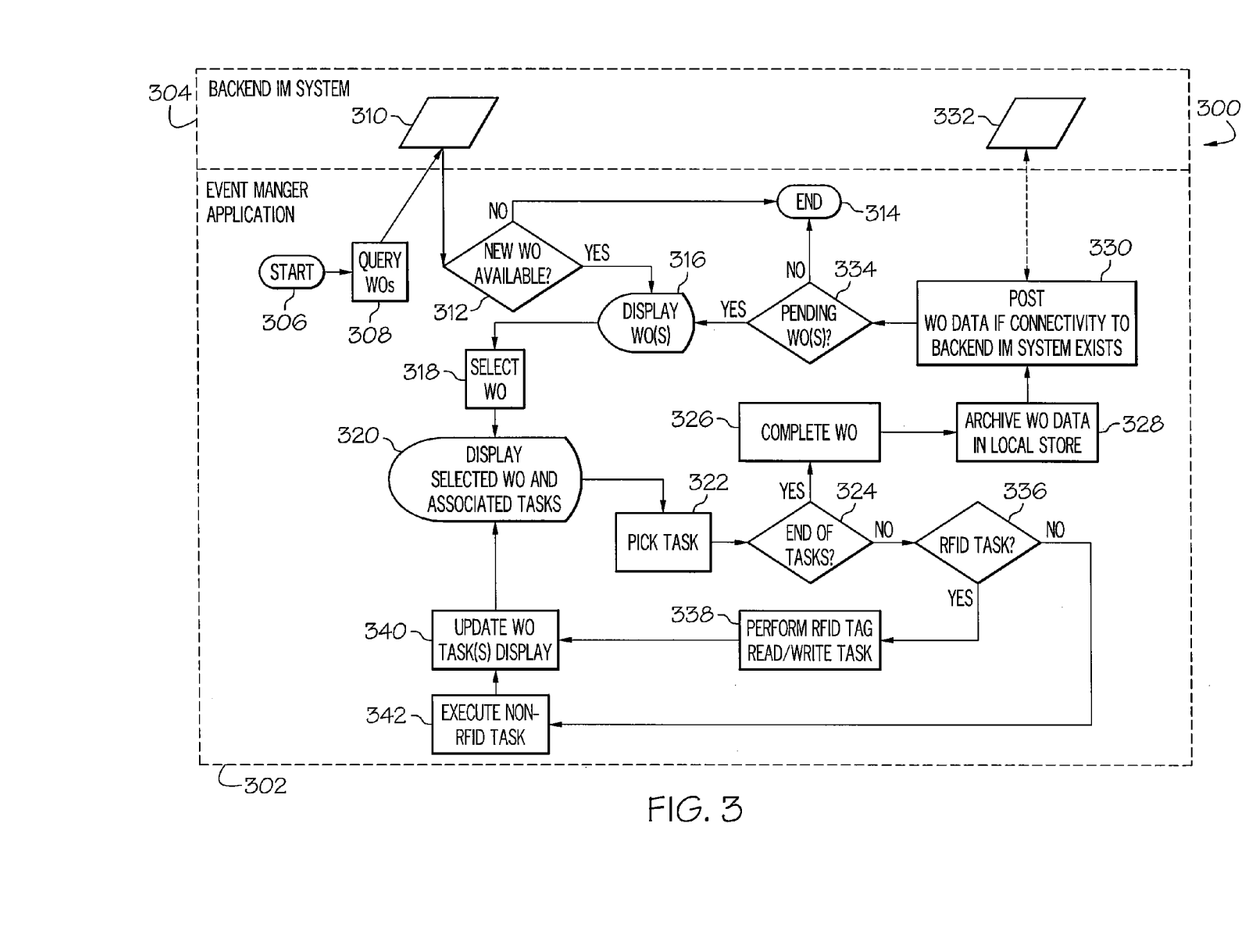
FIG. 3 is a flow chart of an example of a method of operation or interaction between an event manager application and a backend information management (IM) system in accordance with an embodiment of the present invention.

FIG. 3 is a flow chart of an example of a method 300 of operation or interaction between an event manager application 302 and a backend information management (IM) system 304 in accordance with an embodiment of the present invention. The event manager application 302 may be similar to event manager application 118 of FIGS. 1 and 208 of FIG. 2. The backend IM system 304 may be similar to the backend IM system 104 of FIGS. 1 and 2. The method 300 may begin at the start block 306. In block 308, work orders (WOs) may be queried. The query or data request may be sent from the event manager application 302 to the backend IM system 304 as illustrated by block 310. The results of the query may be returned to block 312. In block 312, a determination may be made whether a new work order is available. If a new work order is not available in block 312, the method 300 may end at termination 314. If a new work order is available in block 312, the new work order or work orders may be displayed in block 316.

In block 318, a work order may be selected. In block 320, the selected work order and associated tasks may be displayed. In block 322, a task may be picked or selected. In block 324, a determination may be made if the task picked in block 322 is the last or end of tasks. If the task picked is the end of tasks in block 324, the method 300 may advance to block 326. In block 326, the work order may be completed. In block 328 the work order data may be archived in a local store associated with the event manager application 302. In block 330, work order data may be posted to the backend IM system 304 as illustrated by block 332 if connectivity exists with the backend IM system 304.

From block 330, the method 300 may advance to block 334. In block 334, a determination may be made if there is another pending work order or orders. If there are no pending work orders, the method 300 may end at termination 314. If there are pending work orders, the method 300 may return to block 316 where the remaining work orders may be displayed and the method 300 may proceed as previously described.

If the task picked in block 322 is not the end of tasks in block 324, the method 300 may advance to block 336. In block 336, a determination may be made whether the task picked in block 322 is an RFID task. If the task is an RFID task, a RFID tag read/write task may be performed in block 338. In block 340, the work order task or tasks may be updated and displayed. The method 300 may then return to block 320 and the method may proceed as previously described.

If the determination in block 336 is that the task is not an RFID task, the method 300 may advance to block 342. In block 342, the non-RFID task may be executed. The method 300 may then return to block 340 and the method may proceed as previously described.

Due to limited computational capability associated with passive RFID tags, security mechanisms specified by EPC standards for Class 1 Generation 2 RFID tags rely on simple exclusive OR (EXOR) logic. Accordingly, keyed cryptographic hash may be used to enable validation of RFID tag data integrity. Because the keyed cryptographic hash is computed by the event manager application the present invention is not constrained by the computational capability of the passive RFID tag. The event manager application computes a keyed cryptographic hash, such as a Message Digest Algorithm #5 (MD5) or Secure Hashing Algorithm # 1 (SHA1) or the like, based on current date for liveness and user ID to identify the user using the RFID reader/writer. The RFID tag memory may have one or more user blocks that are of fixed length containing user data formatted per specifications such as ATA Spec. 2000 or other specifications. Each fixed length user block terminates with a fixed field containing the keyed cryptographic hash computed over the entire user block with the fixed field intended for the cryptographic hash set to all "0"s. The computed cryptographic hash is copied on to the terminating fixed field intended for the keyed cryptographic hash for the particular user block of the RFID tag. The keyed cryptographic hash along with user data contents, current date, and user ID is stored on the backend IM system and used by the event manager application to validate the integrity of subsequent data retrievals from the particular RFID tag.

Figure 4:
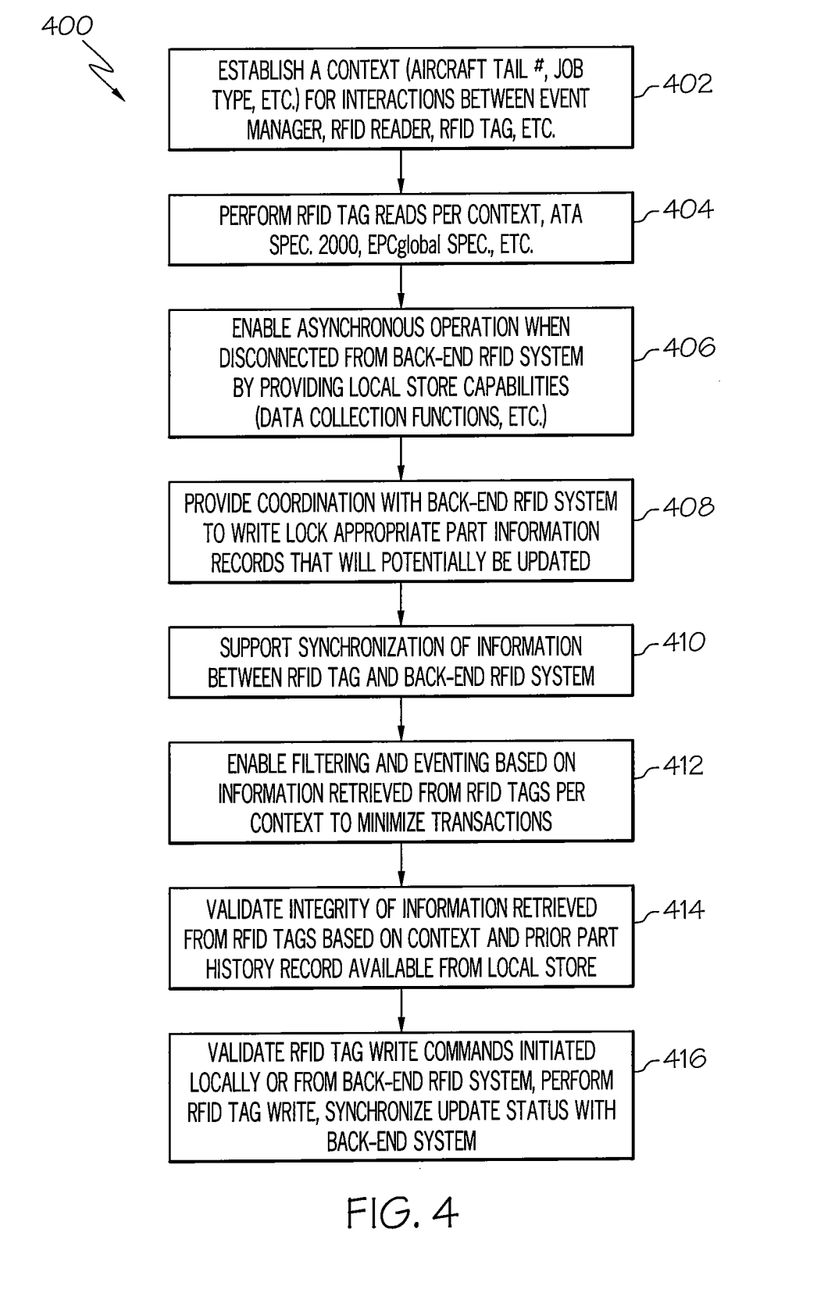
FIG. 4 is a flow chart of an example of a method for data synchronization and integrity between an RFID tag and an RFID system in accordance with an embodiment of the present invention.

FIG. 4 is a flow chart of an example of a method 400 for data synchronization and integrity between an RFID tag similar to RFID tag 108 in FIGS. 1 and 2 and an RFID system similar to system 102 in accordance with an embodiment of the present invention. While the functions and operations are illustrated in FIG. 4 as being performed in a particular order, they need not be performed in any particular order. The method 400 may be embodied in the unique software application #1 or module 120 illustrated in FIG. 1.

In block 402, a context may be established for interactions between an event manager, RFID reader, RFID tag or the like. Examples of the context may be an aircraft identification or tail number, job type or some other indication of the purpose or function of the RFID system and IM system. In block 404, an RFID tag may be read in accordance with the context or predetermined specification, such as ATA Spec 2000 EPCglobal Specification or some other specification related to the application of the system.

In block 406, asynchronous operation may be enabled when disconnected from the RFID system by providing local store capabilities, such as data collection functions, data storage functions and similar capabilities. In block 408, coordination may be provided with the RFID system to write lock appropriate part information records that will potentially be updated or that are updatable by authorized individuals.

In block 410, synchronization of information between RFID tags and the RFID system may be supported or provided. In block 412, filtering and eventing may be enabled based on information retrieved from RFID tags and per the context to minimize transactions. Filtering and eventing may involve selecting or removing certain information, events, occurrences or the like from other information, events or the like.

In block 414, integrity of information retrieved from RFID tags based on the context and prior part history records available from the local store may be validated. In block 416, RFID tag write commands initiated locally or from the RFID system may be validated. RFID tag write operations may be performed and update status may be synchronized with the RFID system.

Figure 5:
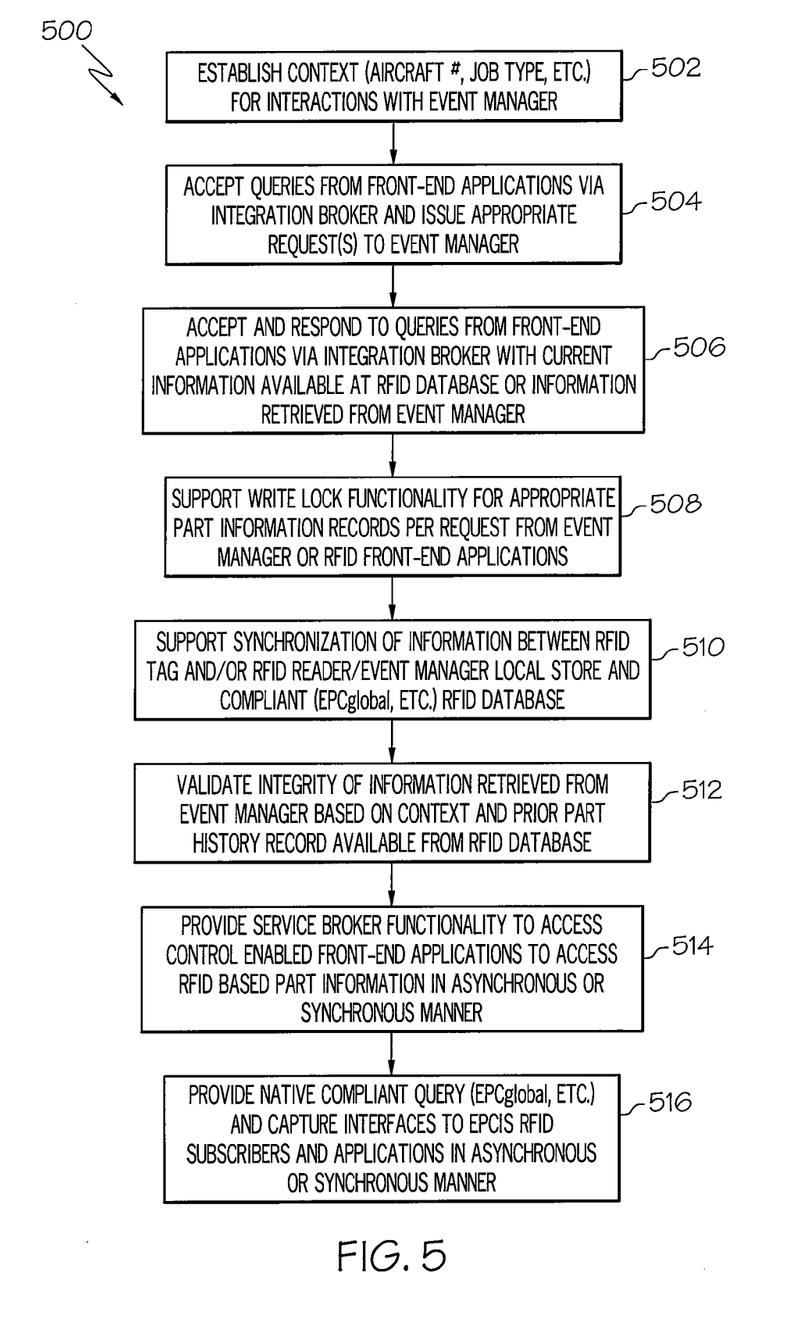
FIG. 5 is a flow chart of an example of a method for RFID information management in accordance with an embodiment of the present invention.

FIG. 5 is a flow chart of an example of a method 500 for RFID information management in accordance with an embodiment of the present invention. While the functions and operations are illustrated in FIG. 5 as being performed in a particular order, they need not be performed in any particular order. The method 500 may be embodied in the unique software application #2 or module 144 illustrated in FIG. 1.

In block 502, a context may be established for interactions with an event manager. As previously described, the context may be an equipment identification, aircraft tail number, job type or some other identification of the application of the system. In block 504, queries may be accepted from front-end applications via an integration broker or the like and appropriate requests may be issued to an event manager similar to event manager 118 described with reference to FIG. 1.

In block 506, queries from the front-end applications may be accepted and responded to via the integration broker (such as integration broker 134 of FIG. 1) with current information available at an RFID database or information retrieved form the event manager. In block 508, write lock functionality may be supported for appropriate part information records per the request from the event manager or RFID front-end applications.

In block 510, synchronization of information between the RFID tag and/or RFID reader/event manager local store and RFID database may be supported. In block 512, integrity of information retrieved from the event manager may be validated based on the context and prior part history record available from the RFID database.

In block 514, service broker functionality may be provided to access control enabled front-end applications to access RFID based part information in an asynchronous or synchronous manner. In block 516, native compliant query and capture interfaces may be provided to EPCIS subscribers and applications in an asynchronous or synchronous manner.

Figure 6:
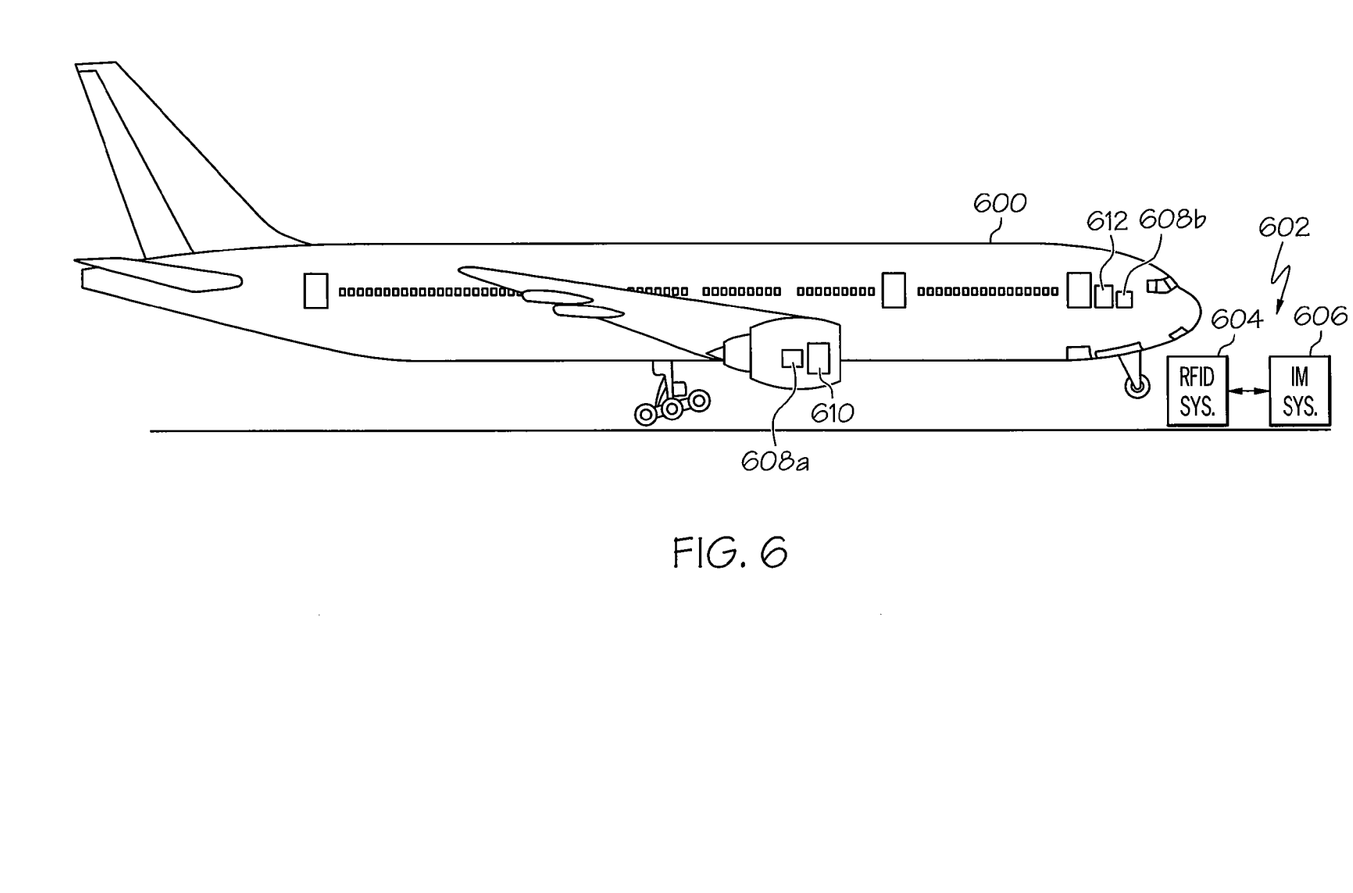
FIG. 6 is an example of an aircraft and RFID system and information management system for use in maintaining the aircraft or for other purposes in accordance with an embodiment of the present invention.

FIG. 6 is an example of an aircraft 600 and system 602 for data synchronization and integrity that may be used in maintaining the aircraft 600 or for other purposes in accordance with an embodiment of the present invention. The system 602 for data synchronization and integrity may be similar to the system 100 of FIG. 1 or system 200 of FIG. 2. The system 602 may include an RFID system 604 and information management (IM) system 606. The RFID system 604 may be similar to the RFID system 102 described with respect to FIGS. 1 and 2. The IM system 604 may be similar to the IM system 104 described with respect to FIGS. 1 and 2. RFID tags 608, similar to RFID tags 108 in FIGS. 1 and 2 may be associated with different components of the aircraft 600. For example, RFID tags 608a may be coupled to or associated with selected engine components 610. RFID tags 608b may be associated with selected flight control components 612 or the like.

The following are different examples of how the system 602 may be used in the maintenance of the aircraft 600. The aircraft 600 may be offline and a maintenance mechanic may perform a work order task on a specific part or item and appropriately updates the RFID tag 608. The tag 608 would store the information and data until a "system of record" on a RFID database, such as RFID database 126 in FIGS. 1 and 2 may be updated.

In another example, a maintenance mechanic may complete a work order but the tag 608 may not be able to be updated because the tag is full and needs to be replaced with a new tag. The RFID database would have more up-to-date information than the tag and the tag could be updated appropriately by the system 602. If a tag 608 is damaged or needs to be replaced with a new tag, a subset of records from the "system of record" could be retrieved from the RFID database, copied on to the tag, and the data may be locked.

In another scenario, a maintenance mechanic may complete a work order but may not have the resources to update the tag 608. Subsequently the aircraft 600 may be offline and another maintenance mechanic may complete a work order task and update the tag 608 associated with the specific part or item before the tag 608 is updated with the prior work order task record. The tag 608 would have a missing work order record that would have to be retrieved from the RFID database and appropriately copied on to the tag to ensure that the chronological order of record is maintained and subsequently locked.

Accordingly, the present invention provides an RFID based sensor network system and information management (IM) infrastructure that is deployable on aircraft or other equipment or systems. The system 100 or 200 of the present invention allows tracking and monitoring of key parts/assemblies on per airline and more specifically, on a per airplane basis. Additionally, the diverse uses of the system 100 or 200 ranges from airplane manufacturing, airplane operations, and business processes such as product lifecycle management (PLM) and geographically spans across the whole world. The system 100 or 200 provide a robust, scaleable, and distributable IM infrastructure system that includes functions such as information collection, storage, and dissemination mechanisms, decision support systems that support PLM and supply chain management (SCM).

Because the airplane is a mobile asset it is unlikely to experience un-interrupted connectivity with the back-end IM systems, i.e., it is possible for the front-end RFID based sensor networks to be disconnected from the back-end IM system when information is being read/written from/to the RFID tags. Therefore, the system 100 or 200 allows the posting and retrieval of information to and from the IM infrastructure for intermittent and/or offline operation capability whereby, the front-end of the information data flow may be disconnected from the back-end information management system for some period to time with no adverse effects. In addition, applications interfacing with the back-end information management system may take into account the state of a particular data record. The application will be able to understand whether it is potentially being or has been updated by the front-end RFID based sensor network with the possibility that the back-end IM system has not fully synchronized with the front-end RFID based sensor network.

As previously described, the system 100 or 200 provides for security and access control applications when using RFID based sensor networks to ensure that the deployed systems adequately protect competition sensitive infrastructure and information associated with the critical business processes. Security of the RFID based sensor network of the present invention provides two complementary technologies: i) securing RFID tags deployed in the front-end of the sensor network; and ii) securing end-to-end data flow from RFID devices to the back-end IM system infrastructure, as previously described. Securing RFID tag data is essential to thwart the entry of counterfeit parts into the supply chain of the original equipment manufacturers (OEM) via early detection. While this is important to industry at large, it is crucial to aerospace, pharmaceutical, and automotive industries. The system 100 or 200 provides access control to provide secure end-to-end data flow to ensure that critical information cannot be queried nor viewed by unauthorized entities. Furthermore, the system of the present invention ensures that Denial of Service (DoS) attacks, such as replay attacks, within the end-to-end data flow are detected and eliminated to prevent it from impacting the IM functions.

The present invention may also utilize high memory passive and active RFID tags that may have capacities in ranges 10 s of kilobits and megabits respectively. Accordingly, expecting to read the entire contents of a tag may not be practical because of data transfer duration and overall system performance constraints. The present invention utilizes a data schema that specifies a memory layout to enable random access of specific fields of interest from the tag memory per the defined schema. In addition, the front-end application(s) on the RFID reader interact with the tag via a reader/tag using a protocol that includes the context and the task that can be decomposed into specific commands that the application may issue based on the reader/tag protocol specification. Thus, a tag read operation may be targeted to meet the application needs within the context of the usage scenario. Similarly, tag write operations may be conditional to the application needs within the context of the usage scenario.

Data synchronization with such high memory tags may require the need for transaction atomicity that enables expedited synchronization between the tag and the backend database (EPC IS repository). This may be accomplished by minimizing the amount of data that is read or written from/to the tag and the back-end database by targeting specific components of the data string. The transaction atomicity is preferably coordinated with the schema defined for the tag memory layout.

As previously described, the present invention provides mechanisms and processes to ensure appropriate write locks for tag and back-end database updates in the event of overlapping or closely spaced write events to the tag and/or updates to the back-end database. In the case of other continuous sensors, i.e., Integrated Vehicle Health Management (IVHM), data fusion/integration is a generalized case of the above, where between distinct synchronization intervals, the current sensor reading and database values could be different and hence appropriate estimation by the back-end computing system may be needed.

In effect, the discrete case of RFID tag updates is a specialized case of a continuous sensor, where one does not need to estimate the current value for the RFID tag as it would be the same unless a write lock has been acquired. The front-end application on the RFID reader would also include store-forward capability so that it continues to operate and be functional even when disconnected from the backend IM system.

Similar to that described with respect to FIG. 2, one embodiment of the present invention may include a front-end application on a portable reader that may also include an event manager functionality, i.e., data collection, filtering, notification functions and the like. Conversely, in the fixed portal reader environment the event manager functionality may be located within a separate computing device that could provide event manager functionality to multiple fixed portal readers similar to the embodiment of the present invention shown in FIG. 1. In this case, the event manager performs aggregation functions for multiple fixed portal readers within the local environment in addition to store-forward capability. As previously described, one embodiment of the present invention co-locates the event manager functionality within the front-end application for portable readers. Also, similar to the portable reader, having a front-end application with store-forward capability on the fixed portal reader ensures that critical data at the reader is not lost due to transient or disrupted network connectivity.

In another embodiment of the present invention, RFID tag security may involve allowing a write-once read-many (WORM) capability, i.e., once written and locked the particular field cannot be updated. Also, the write/read operation may require a password key for access control. The tag security may allow for a 32-bit access password. Servicing and maintenance may involve many stakeholders, for example an aircraft manufacturer, airlines, liner replaceable unit (LRU) suppliers/vendors, maintenance providers and the like. Accordingly, the 32-bit access password may need to be shared by multiple entities. The 32-bit access password provides some information assurance; however, the use of an exclusive OR (EXOR) logic mechanism for access control between the reader and the tag combined with the need for multiple entities to share the same access password could potentially result in the leakage of the 32-bit access password. The present invention provides an extensive cryptographic hash mechanism to substantially prevent leakage and improve security.

Under this scenario, should protection against malicious intent be of concern, then at a minimum it would be prudent to include the signature hash of the person, that includes liveness/temporal characteristics, who is performing the write to be included on the tag associated with the update. This will ensure that the reader and back-end IM system will be able to validate the read field to ensure that spurious/erroneous data can be discarded and alert the network management entity of any such information assurance issues.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for data synchronization, comprising:
a radio frequency identification (RFID) system comprising: at least one RFID tag associated with a component of a vehicle, an RFID reader to read the at least one RFID tag, and an RFID application collocated with the RFID reader;
an information management system comprising an RFID database for storing RFID tag data;
wherein the RFID application comprises a module for data synchronization and integrity between the at least one RFID tag on board the vehicle and the information management system, wherein the module is adapted to enable asynchronous operation when the at least one RFID tag is disconnected from the information management system by providing a local store and data collection function for collecting and storing data related to maintenance of the vehicle until the RFID database is updated by connecting to the information management system, the module for data synchronization and integrity between the at least one RFID tag and the information management system being further configured to perform a group of operations comprising:
establish a context for interactions with an event manager, the RFID reader, and the at least one RFID tag;

perform RFID tag reads per the context and any predetermined specifications;

provide coordination with the RFID system to write lock appropriate information records that will be updated;

support synchronization of information between the at least one RFID tag and the RFID system;

enable filtering and eventing based on information retrieved from the at least one RFID tag per the context to minimize transactions;

validate integrity of information retrieved from the at least one RFID tag based on the context and prior history record available from the local store;

validate RFID tag write commands initiated locally or from the RFID system, perform the RFID tag write, and synchronize update status with the RFID system; and another module to perform a group of operations comprising:

establish a context for interactions with the event manager;

accept any queries via an integration broker and issue a request to the event manager;

accept and respond to any queries via the integration broker with current information available at the RFID database or information retrieved from the event manager;

support a write lock functionality for the appropriate information records per a request from the event manager or an application that requests information;

support synchronization of information between the RFID tag and the RFID reader or the event manager and the RFID database;

validate integrity of information retrieved from the event manager based on the context and a prior history record available from the RFID database;

provide a service broker to asynchronously or synchronously access the information; and provide query and capture interfaces for subscribers and applications for asynchronous or synchronous access.

2. The system of claim 1, wherein the RFID system comprises:

a data schema associated with the at least one RFID tag, wherein the data schema is adapted to minimize an amount of data to be read from the RFID tag in response to a particular query.

3. The system of claim 1, wherein the event manager is configured to manage interactions between the RFID reader and the information management system.

4. The system of claim 3, further comprising a data store-forward capability associated with at least one of the RFID reader and the event manger to ensure continued operation when the RFID system is disconnected from the information management system and to ensure there is no data loss during a disconnect period.

5. The system of claim 3, wherein the RFID reader comprises a context and event manager functionality to ensure contextual RFID tag read and write operation.

6. The system of claim 1, further comprising a data locking and synchronization mechanism between the information management system and the RFID system.

7. The system of claim 1, further comprising:

a plurality of RFID tags; and a cryptographic hash on each RFID tag for writing data to ensure data validation for data read from the tag and that is stored on the information management system.

8. The system of claim 1, further comprising an integration broker to interface between the information management system and a front-end application.

9. The system of claim 1, further comprising validation means to validate data to and from the RFID tag.

10. The system of claim 9, wherein the validation means comprises a keyed cryptographic hash.

11. A method for data synchronization, comprising:

providing a data schema to minimize an amount of data to be read from an RFID tag on board a vehicle, wherein the RFID tag forms part of an RFID system;

maintaining context and event manager functionality on an RFID reader to facilitate contextual RFID tag read/write operation;

enabling asynchronous operation of the RFID tag by an application collocated with the RFID reader for data synchronization and integrity between the RFID tag and an information management system when the RFID system is disconnected from the information management system, wherein the application provides a local store and data collection function for collecting and storing data related to maintenance of the vehicle until a RFID database in the information management system is updated by connecting the information management system to the RFID system;

establishing a context for interactions with an event manager, the RFID reader, and the RFID tag;

performing RFID tag reads per the context and any predetermined specifications;

providing coordination with the RFID system to write lock appropriate information records that will be updated;

supporting synchronization of information between the RFID tag and the RFID system;

enabling filtering and eventing based on information retrieved from the RFID tag per the context to minimize transactions;

validating integrity of information retrieved from the RFID tag based on context and a prior history record available from the local store;

validating RFID tag write commands initiated locally or from the RFID system, perform the RFID tag write, and synchronize update status with the RFID system;

accepting queries from applications via an integration broker and issuing an appropriate request or requests to the event manager;

accepting and responding to queries from the applications via the integration broker with current information available at the RFID database or information retrieved from the event manager;

supporting write lock functionality for appropriate information records per request from the event manager or the applications;

supporting synchronization of information between the RFID tag and the RFID reader or event manager local store and the RFID database;

validating integrity of information retrieved from the event manager based on the context and a prior history record available from the RFID database;

providing service broker functionality to asynchronously or synchronously access information; and providing query and capture interfaces to subscribers and applications in an asynchronous or synchronous manner.

12. The method of claim 11, further comprising providing a data store-forward capability within the RFID reader and an event manager for continued operation when disconnected from an information management system and to prevent loss of data during a disconnection.

13. The method of claim 11, further comprising providing a data locking mechanism and a synchronization mechanism between a front-end application and a data management system for proper operation of backend applications and decision support systems.

14. The method of claim 11, further comprising maintaining a cryptographic hash on the RFID tag for write operations to ensure data validation for data read from the RFID tag and stored on an information management system.

15. The method of claim 11, further comprising validating data to and from the RFID tag.

16. The method of claim 15, wherein validating data to and from the RFID tag comprises using a keyed cryptographic hash.

17. A system for maintaining an aircraft, comprising:
an RFID system for reading and writing information on an RFID tag associated with a component of the aircraft, the RFID system comprising an RFID reader and an RFID application collocated with the RFID reader;
an information management system comprising an RFID database for storing RFID tag data; and
wherein the RFID application comprises a module for data synchronization and integrity between the RFID tag on board the aircraft and the information management system, wherein the module is adapted to enable asynchronous operation when the RFID tag is disconnected from the information management system by providing a local store and data collection function until the RFID database is updated by connecting to the information management system, the module for data synchronization and integrity between the RFID tag and the information management system being further configured to perform a group of operations comprising:
establish a context for interactions with an event manager, the RFID reader, and the RFID tag;
perform RFID tag reads per the context and any predetermined specifications;
provide coordination with the RFID system to write lock appropriate information records that will be updated;
support synchronization of information between the RFID tag and the RFID system;
enable filtering and eventing based on information retrieved from the RFID tag per the context to minimize transactions;
validate integrity of information retrieved from the RFID tag based on the context and prior history record available from the local store;
validate RFID tag write commands initiated locally or from the RFID system, perform the RFID tag write, and synchronize update status with the RFID system; and
another module to perform a group of operations comprising:
accept any queries via an integration broker and issue a request to the event manager;
accept and respond to any queries via the integration broker with current information available at the RFID database or information retrieved from the event manager;
support a write lock functionality for the appropriate information records per a request from the event manager or an application that requests information;
support synchronization of information between the RFID tag and the RFID reader or the event manager and the RFID database;
validate integrity of information retrieved from the event manager based on the context and a prior history record available from the RFID database;
provide a service broker to asynchronously or synchronously access the information; and
provide query and capture interfaces for subscribers and applications for asynchronous or synchronous access.

18. The system of claim 17, further comprising a data schema associated with the RFID tag adapted to minimize an amount of data to be read from the RFID tag in response to a particular query.

19. The system of claim 17, further comprising:
an event manager to manage interactions between the RFID reader and the information management system.

20. The system of claim 19, further comprising a data store-forward capability associated with at least one of the RFID reader and the event manger to ensure continued operation when the RFID system is disconnected from the information management system and to ensure there is no data loss during a disconnect period.

21. The system of claim 19, further comprising a context and event manager functionality on the RFID reader to ensure contextual RFID tag read and write operation.

22. The system of claim 17, further comprising:
a data locking mechanism between a front-end application and the information management system; and
a synchronization mechanism between the front-end application and the information management system, wherein the data locking mechanism and the synchronization mechanism ensure proper operation of any backend applications and decision support systems.

23. The system of claim 17, further comprising a cryptographic hash on the RFID tag for data validation.

24. A method for maintaining an aircraft, comprising:
associating an RFID tag with an aircraft component;
providing security for data on the RFID tag;
enabling asynchronous operation of the RFID tag by an RFID application collocated with an RFID reader for data synchronization and integrity between the RFID tag and an information management system when the RFID tag is disconnected from the information management system, wherein the RFID application provides a local store and data collection function for collecting and storing data related to maintenance of the aircraft until a RFID database in the information management system is updated by connecting to the information management system;
establishing a context for interactions with an event manager, RFID reader, and RFID tag;
performing RFID tag reads per the context and any predetermined specifications;
providing coordination with the RFID system to write lock appropriate information records that will potentially be updated;
supporting synchronization of information between the RFID tag and the RFID system;
enabling filtering and eventing based on information retrieved from the RFID tag per the context to minimize transactions;
validating integrity of information retrieved from the RFID tag based on context and a prior history record available from the local store;
validating RFID tag write commands initiated locally or from the RFID system, perform the RFID tag write, and synchronize update status with the RFID system;

accepting queries from applications via an integration broker and issuing an appropriate request or requests to the event manager;

accepting and responding to queries from the applications via the integration broker with current information available at the RFID database or information retrieved from the event manager;

supporting write lock functionality for appropriate information records per request from the event manager or the applications;

supporting synchronization of information between the RFID tag and the RFID reader or event manager local store and the RFID database;

validating integrity of information retrieved from the event manager based on the context and a prior history record available from the RFID database;

providing service broker functionality to asynchronously or synchronously access information; and providing query and capture interfaces to subscribers and applications in an asynchronous or synchronous manner.

25. The method of claim 24, wherein providing security for data on the RFID tag comprises providing a cryptographic hash for data validation.

26. The method of claim 24, further comprising providing a data schema to minimize an amount of data to be read from the RFID tag.

27. The method of claim 24, further comprising maintaining context and event manager functionality on the RFID reader to facilitate contextual RFID tag read/write operation.

28. The method of claim 24, further comprising providing a data store-forward capability within the RFID reader and an event manager for continued operation when disconnected from an information management system and to prevent loss of data during a disconnection.

29. The method of claim 24, further comprising providing a data locking mechanism between a front-end application and a data management system.

30. The method of claim 24, further comprising providing a synchronization mechanism for proper operation of any backend applications and decision support systems.

* * * * *